United States Patent
Cho

(10) Patent No.: US 11,232,653 B2
(45) Date of Patent: Jan. 25, 2022

(54) SMART VEHICLE SYSTEM

(71) Applicant: SK hynix Inc., Icheon-si (KR)

(72) Inventor: Ho Sung Cho, Hwaseong-si (KR)

(73) Assignee: SK hynix Inc., Icheon-si (KR)

( * ) Notice: Subject to any disclaimer, the term of this patent is extended or adjusted under 35 U.S.C. 154(b) by 255 days.

(21) Appl. No.: 16/370,511

(22) Filed: Mar. 29, 2019

(65) Prior Publication Data

US 2020/0193741 A1    Jun. 18, 2020

(30) Foreign Application Priority Data

Dec. 14, 2018  (KR) .................. 10-2018-0161535

(51) Int. Cl.
| | |
|---|---|
| G07C 5/08 | (2006.01) |
| G07C 5/00 | (2006.01) |
| G05D 1/00 | (2006.01) |
| G07C 5/10 | (2006.01) |

(52) U.S. Cl.
CPC ......... *G07C 5/0808* (2013.01); *G05D 1/0055* (2013.01); *G07C 5/008* (2013.01); *G07C 5/085* (2013.01); *G07C 5/10* (2013.01)

(58) Field of Classification Search
CPC ........ G07C 5/0808; G07C 5/008; G07C 5/10; G07C 5/085; G05D 1/0055; G05B 23/0224; G05B 2219/24065; G01M 17/007; G01D 21/02
See application file for complete search history.

(56) References Cited

U.S. PATENT DOCUMENTS

| | | | | |
|---|---|---|---|---|
| 8,301,411 | B2 * | 10/2012 | Okayasu | G06F 11/24 702/179 |
| 2017/0162276 | A1 * | 6/2017 | Ok | G11C 29/36 |
| 2019/0050160 | A1 * | 2/2019 | Dardis | G06F 3/0616 |
| 2019/0056879 | A1 * | 2/2019 | Hudson | G06F 3/0608 |

\* cited by examiner

*Primary Examiner* — Michael V Kerrigan

(57) ABSTRACT

A smart vehicle system is disclosed, which relates to technology for increasing driving stability of a vehicle by performing a test related to reliability of the vehicle. The smart vehicle system includes a test information storage circuit, a controller, and a test circuit. The test information storage circuit classifies a test control information, a test condition information, and a test result information according to a plurality of test levels, and to stores a classified test result information therein. The controller determines at least one parameter value for performing a reliability test in response to a sensing information, the test control information, and the test condition information, and to generates a test enable signal in response to the parameter value. The test circuit tests a characteristic of a storage circuit in response to the test enable signal.

20 Claims, 8 Drawing Sheets

| TEST CASE : | CASE1 | CASE2 | CASE3 | CASE4 | CASE5 |
|---|---|---|---|---|---|
| LOW LEVEL : | PASS | PASS | PASS | PASS | PASS |
| INTERMEDIATE LEVEL : | PASS | PASS | PASS | PASS | PASS |
| HIGH LEVEL : | FAIL | PASS | PASS | FAIL | PASS |

| TEST CASE : | CASE1 | CASE2 | CASE3 | CASE4 | CASE5 |
|---|---|---|---|---|---|
| LOW LEVEL : | ○ | ○ | × | ○ | × |
| INTERMEDIATE LEVEL : | ○ | ○ | × | × | × |
| HIGH LEVEL : | ○ | ○ | × | ○ | × |

| TEMPERATURE : | A °C | B °C | C °C | D °C | E °C |
|---|---|---|---|---|---|
| LOW LEVEL : | 5ms | 2ms | 8*ms | 4*ms | 2*ms |
| INTERMEDIATE LEVEL : | 4ms | 1ms | 7*ms | 3*ms | 1*ms |
| HIGH LEVEL : | 4ms | 1ms | 6*ms | 3*ms | 1*ms |

FIG. 6

SMART VEHICLE SYSTEM

CROSS-REFERENCE TO RELATED APPLICATION

This application claims priority to Korean patent application No. 10-2018-0161535, filed on Dec. 14, 2018, the disclosure of which is hereby incorporated by reference in its entirety as if fully set forth herein.

BACKGROUND OF THE INVENTION

1. Technical Field

Embodiments of the present disclosure may generally relate to a smart vehicle and methods of operating a smart vehicle and a smart vehicle system, and more particularly to a smart vehicle system with technology for increasing driving stability and reliability of a vehicle by performing a test related to reliable vehicle operation.

2. Related Art

Recently, as various mobile communication devices, such as smartphones, tablets, etc. for example, have been widely used throughout the world, the demand for information technology (IT) convergence and for the unification of digital information across devices and platforms has increased. For example, demand for infotainment, telematics, etc. within vehicles is rapidly increasing. Therefore, many developers and companies have focused attention on smart vehicle technology for providing drivers and passengers with higher safety, reliability, convenience and comfort using information communication technology available for use in vehicle industries.

As a non-limiting example of a vehicle, a smart vehicle may refer to a car, truck or automobile to which various Information and Communication Technologies (ICT) are applied and/or installed. The smart vehicle may combine or collect various kinds of in-vehicle information, may manage the unified in-vehicle information, and may provide drivers and passengers with various content and data, for example, entertainment-related content, information content, convenience-related content, etc.

The smart vehicle has been developed by combining traditional mechanical-based vehicle technology with the modern technologies, for example, next-generation electrical and electronics technologies, information communication technologies, intelligence control technologies, artificial intelligence technologies, etc. Therefore, the smart vehicle is able to collect, in real time, information about the vehicle itself, its internal environment, and a peripheral region of a vehicle, including information about in-vehicle devices, so that such information can increase the operational reliability and stability of the smart vehicle. In addition, the smart vehicle includes various convenience-related or comfort-related functions and operations that can be augmented with the information, resulting in an increase in user satisfaction or comfort.

BRIEF SUMMARY OF THE INVENTION

Various embodiments of the present disclosure are directed to providing a smart vehicle system in a vehicle that substantially obviates one or more problems due to limitations and disadvantages of the related art, as well as to methods of operating the vehicle and the smart vehicle system.

The embodiments of the present disclosure relate to a smart vehicle with a smart vehicle system that performs tests related to the operational reliability or stability of a smart vehicle, records the results of the tests, with the goal of increasing operational stability or reliability of the smart vehicle, as well as to methods of operating the smart vehicle to achieve the goals. Although embodiments herein are described with respect to a smart car, it will be understood that the scope of the present disclosure in not limited thereto, and includes other smart vehicles known to those having ordinary skill in the art.

In accordance with an embodiment of the present disclosure, a smart vehicle system includes a test information storage circuit configured to classify a test control information, a test condition information, and a test result information according to a plurality of test levels, and to store a classified test result information therein, a controller configured to determine at least one parameter value for performing a reliability test in response to a sensing information, the test control information, and the test condition information, and to generate a test enable signal in response to the parameter value, and a test circuit configured to test a characteristic of a storage circuit in response to the test enable signal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other features and advantages of the present disclosure will become readily apparent by reference to the following detailed description when considered in conjunction with the accompanying drawings wherein:

FIG. 4 is a conceptual diagram illustrating an example of a test result storage circuit shown in FIG. 3 according to an embodiment of the present disclosure.

FIG. 5 is a conceptual diagram illustrating an example of a test control information storage circuit shown in FIG. 3 according to an embodiment of the present disclosure.

FIG. 6 is a conceptual diagram illustrating an example of a test condition storage circuit shown in FIG. 3 according to an embodiment of the present disclosure.

DESCRIPTION OF EMBODIMENTS

Reference will now be made in detail to embodiments of the present disclosure, examples of which are illustrated in the accompanying drawings. Wherever possible, the same reference numbers are used throughout the drawings to refer to the same or like portions. Throughout the specification of the present disclosure, if it is assumed that a certain part is connected (or coupled) to another part, then the term "connection or coupling" means that the certain part is directly connected (or coupled) to another part and/or is electrically connected (or coupled) to another part through another medium. Throughout the specification of the present disclosure, if it is assumed that a certain part includes a certain component, then the term "comprising", "having", or "including" means that a corresponding component may further include other components unless a specific meaning opposed to the corresponding component is written. As used in the specification and appended claims, the terms "a", "an", "one", "the" and other similar terms include both singular and plural forms, unless context clearly dictates otherwise. The terms used in the present application are merely used to describe specific embodiments and are not intended to limit the present disclosure. A singular expression may include a plural expression unless otherwise stated in the context.

Figure 1:
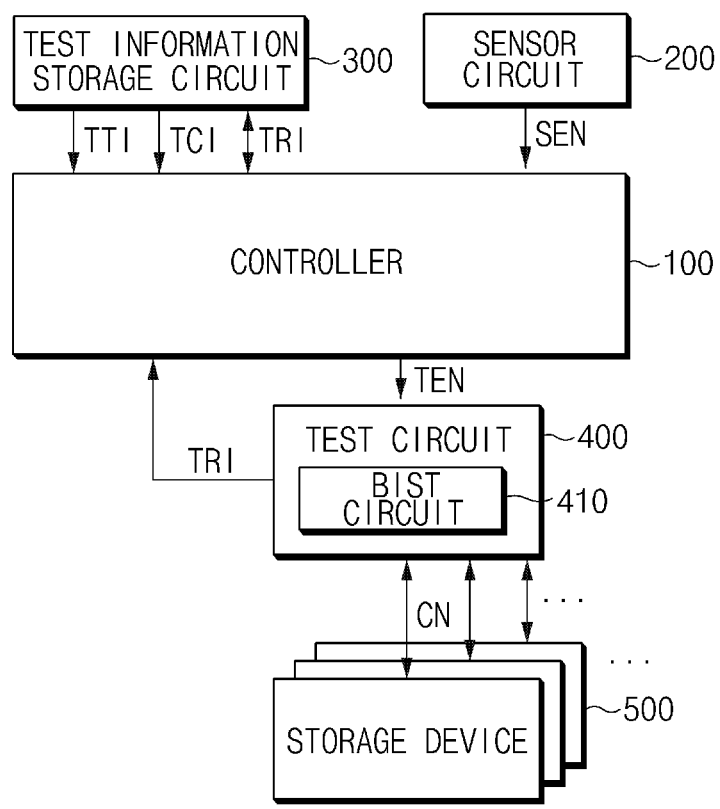
FIG. 1 is a block diagram illustrating an example of a smart vehicle system in a smart vehicle according to an embodiment of the present disclosure.

FIG. 1 is a block diagram illustrating a smart vehicle system 10 of a smart vehicle according to an embodiment of the present disclosure.

Referring to FIG. 1, a smart vehicle includes a smart vehicle system 10, which may include a controller 100, a sensor circuit 200, a test information storage circuit 300, a test circuit 400, and a storage device 500.

The controller 100 may control overall operation of the smart vehicle system 10. The controller 100 may determine at least one parameter with an associated value for testing related to the operational reliability of a vehicle in response to test control information TCI, test condition information TTI, and sensing information SEN. The controller 100 may generate a test enable signal TEN, for controlling operations of the test circuit 400, that is related to the determined parameter. In addition, the controller 100 may store test result information TRI received from the test circuit 400 in the test information storage circuit 300.

The sensor circuit 200 may acquire sensing information SEN by detecting information about the internal environment of a smart vehicle (hereinafter referred to as "in-smartcar environment information"), and may output the acquired sensing information SEN to the controller 100. In-smartcar environment information may include, for example, ambient cabin temperature information and voltage information. Of course, other sensing information that triggers the selection of other parameters are also contemplated by the disclosure.

The sensor circuit 200 may detecting the temperature or voltage of the electronic device in the smartcar. For example, the sensor circuit 200 may detect the temperature of the electronic device based on a resistance value of a temperature measuring resistance element, such as a thermistor, provided to the electronic device or based on a temperature measuring means that performs a measurement according to a characteristic change due to the temperature of the semiconductor. The sensor circuit 200 may detect the temperature of the electronic device when the diagnostic circuit is performing each of the tests. The sensor circuit 200 may detect and hold temperature changes over constant intervals during actual operation of the electronic device.

The test information storage circuit 300 may pre-store test control information TCI and test condition information TTI. The test control information TCI and the test condition information TTI are used in performing the tests related to the operational reliability or stability of the vehicle, and may be preset or predetermined by a user or the manufacturer of the smart vehicle, either ab initio, or based on information accumulated through testing. The test information storage circuit 300, under the control of the controller 100, may store test result information TRI of the test circuit 400.

The test information storage circuit 300 may be implemented as an electrical fuse, a non-volatile memory, a register, or the like as non-limiting examples. The electrical fuse, the non-volatile memory, or the register can be implemented with specific predetermined values, or they can be set to values as a result of testing. Although embodiments of the present disclosure have disclosed as examples that information in the test information storage circuit 300 is stored in any one of the electrical fuse, the non-volatile memory, and the register for convenience of description and better understanding of the present disclosure, the scope or spirit of the present disclosure is not limited thereto, and it should be noted that various kinds of storage circuits may also be used in embodiments herein as necessary or as desired.

The test circuit 400 may test characteristics of the storage device 500, such as the operation of the device and/or the data stored in the device, in response to a test enable signal TEN received from the controller 100. The test circuit 400 may test characteristics of the storage device 500, and may output test result information TRI to the controller 100. The test circuit 400 may test characteristics of the storage device 500 using an embedded Built-In Self-Test (BIST) circuit 410.

The storage device 500 may be used as a storage medium of the smart vehicle system 10. The storage device 500 may be implemented as a plurality of storage devices 500, and the plurality of storage devices 500 may be coupled to the test circuit 400 through a plurality of respective channels CN. The storage device 500 may be implemented as a volatile memory, a non-volatile memory, or the like.

In embodiments of the present disclosure, it has been disclosed as examples that the storage device 500, as a storage medium for storing information, is implemented as a volatile memory, a non-volatile memory, or the like for convenience of description and better understanding of the present disclosure. However, the scope or spirit of the storage device 500 according to embodiments of the present disclosure is not limited thereto.

For example, the storage device 500 according to other embodiments of the present disclosure may include various non-volatile memory devices, such as an Electrically Erasable and Programmable ROM (EEPROM), a NAND flash memory, a NOR flash memory, a Phase-Change RAM (PRAM), a Resistive RAM (ReRAM), a Ferroelectric RAM (FRAM), and a Spin Torque Transfer Magnetic RAM (STT-MRAM), as non-limiting examples.

The storage device 500 according to yet other embodiments of the present disclosure may be implemented as any one of various storage devices, such as a Solid State Drive (SSD), a Multi Media Card (MMC), an Embedded MMC (eMMC), a Reduced Size MMC (RS-MMC), a micro-MMC, a Secure Digital (SD) card, a mini Secure Digital (mini-SD) card, a micro Secure Digital (micro-SD) card, a Universal Serial Bus (USB) memory, a Universal Flash Storage (UFS) device, a Personal Computer Memory Card International Association (PCMCIA) card-type memory, a Peripheral Component Interconnection (PCI) card-type memory, a PCI-express (PCI-E) card-type memory, a Compact Flash (CF) card, a Smart Media (SM) card, and a memory stick, as further non-limiting examples.

In addition, the storage device 500 according to still other embodiments of the present disclosure may be implemented as any one of various kinds of packages, such as a Package On Package (POP), a System In Package (SIP), a System On Chip (SOC), a Multi-Chip Package (MCP), a Chip On Board (COB), a wafer-level fabricated package (WFP), and a wafer-level stack package (WSP), as yet further non-limiting examples.

As described above, the smart vehicle with smart vehicle system 10 according to embodiments disclosed herein may test characteristics of the storage device 500 based on test control information TCI, test condition information TTI, and previous test results stored in the test information storage circuit 300, and may accumulate and store test result information TRI in the test information storage circuit 300. The tests assess the operational reliability of the storage device 500 and the data stored therein, which is used to control or operate the smart vehicle. In addition, the smart vehicle system 10 according to embodiments may compare the test result information TRI of the test circuit 400 with a previous test result that is stored in test information storage circuit 300. The controller 100 may transmit the test result to an external device, which can be further used to improve or maintain the operational stability or reliability of the vehicle. For example, a host, an analysis circuit, an optical storage medium or the like can be used as the external device.

Figure 2:
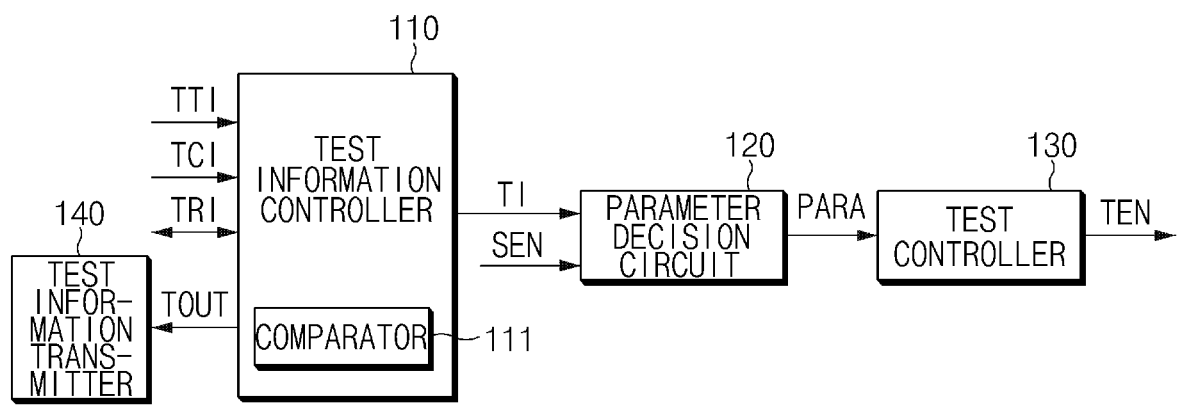
FIG. 2 is a block diagram illustrating an example of a controller shown in FIG. 1 according to an embodiment of the present disclosure.

FIG. 2 is a block diagram illustrating the controller 100 shown in FIG. 1 according to an embodiment of the present disclosure.

Referring to FIG. 2, the controller 100 may include a test information controller 110, a parameter decision circuit 120, a test controller 130, and a test information transmitter 140.

The test information controller 110 may read test control information TCI and test condition information TTI from the test information storage circuit 300, and may output test information TI to the parameter decision circuit 120. The test information TI may be achieved by combining the test control information TCI and the test condition information TTI. The test information controller 110 may store test result information TRI received from the test circuit 400 in the test information storage circuit 300. The test information controller 110 may read the test result information TRI from the test information storage circuit 300. The test information controller may determine whether to execute testing based on the test result information TRI from the test information storage circuit 300. The test information controller 110 may transmit output information TOUT to an external monitoring device (not shown) through the test information transmitter 140.

The test information controller 110 may include a comparator 111. The comparator 111 may compare previous test result information TRI stored in the test information storage circuit 300 with current test result information TRI received from the test circuit 400. By comparing previous test result information TRI stored in the test information storage circuit 300 with current test result information TRI received from the test circuit 400, the comparator 111 may determine occurrence or non-occurrence of an additional fault, error or defect. If an additional fault has occurred, then the comparator 111 may accumulate information about occurrence of the additional fault in the test information storage circuit 300, such that the accumulated information is stored or written in the test information storage circuit 300. The test information controller 110 may convert such additional fault occurrence information detected by the comparator 111 into output information TOUT, and may transmit the output information TOUT to the test information transmitter 140.

The parameter decision circuit 120 may determine a parameter with an associated value PARA needed to perform testing in response to test information TI received from the test information controller 110 and sensing information SEN received from the sensor circuit 200. The parameter value PARA may be a parameter associated with operations or characteristics of the storage device 500. For example, when the sensing information SEN acquired from the sensor circuit 200 is temperature information, the parameter decision circuit 120 may determine a data retention time related to temperature information stored in the storage device 500 according to reliability-related testing levels that correspond to different temperatures.

The test controller 130 may generate a test enable signal TEN to control operations of the test circuit 400 in response to the parameter value PARA received from the parameter decision circuit 120. For example, the test controller 130 may control an access (AC) timing point (i.e., an access time point at which the test circuit performs testing) of the test circuit 400 in response to the parameter value PARA.

Figure 3:
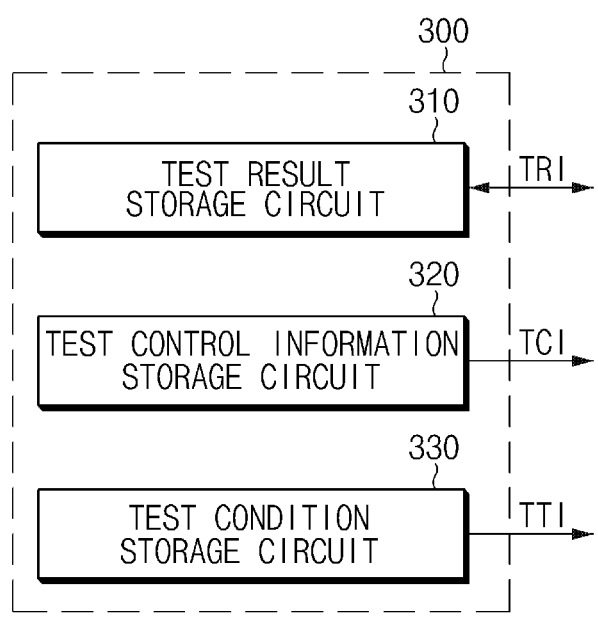
FIG. 3 is a block diagram illustrating an example of a test information storage circuit shown in FIG. 1 according to an embodiment of the present disclosure.

FIG. 3 is a block diagram illustrating the test information storage circuit 300 shown in FIG. 1 according to an embodiment of the present disclosure.

Referring to FIG. 3, the test information storage circuit 300 may include a test result storage circuit 310, a test control information storage circuit 320, and a test condition storage circuit 330. The test result storage circuit 310 may store test result information TRI received from the test information controller 110. In addition, test result information TRI stored in the test result storage circuit 310 may be read or accessed by the test information controller 110.

The test control information storage circuit 320 may store test control information TCI used by controller 100 to control operations of the test circuit 400. The test condition storage circuit 330 may store test condition information TTI, which may also be used by controller 100 to control the test circuit 400.

FIG. 4 is a conceptual diagram illustrating the test result storage circuit 310 shown in FIG. 3 according to an embodiment of the present disclosure.

Referring to FIG. 4, the test result storage circuit 310 may classify test result information TRI of individual test cases into a plurality of test result information segments according to test levels. The test result storage circuit 310 may construct or organize the plurality of test result information segments in the form of a table. The table-shaped test result information segments may be stored in the test result storage circuit 310. The test levels may be pre-established as specifications by accumulating test results having various conditions according to the individual test cases.

For example, the test levels for each of test cases CASE1~CASE5 may be classified into a low-level test, an intermediate-level test, and a high-level test. The expression "LOW LEVEL" may refer to an operation level in which high reliability, with respect to the operations of storage device 500, is not required. The expression "INTERMEDIATE LEVEL" may refer to an operation level in which a reliability level, with respect to the operations of storage device 500, is considered normal or general so that a test level is also set to a normal or intermediate level. The expression "HIGH LEVEL" may refer to an operation level in which high reliability, with respect to the operations of storage device 500, is needed so that a test level is set to high.

Referring to FIG. 4, in this example, the same test results, each of which is denoted by "PASS", may be written in all of the low-level parts or segments (LOW LEVEL); in all of the intermediate-level parts or segments (INTERMEDIATE LEVEL) of the respective test cases CASE1~CASE5; and in the second, third, and fifth cases CASE2, CASE3, and CASE5 of high-level parts or segments. The other test result "FAIL" may be written in each of high-level parts or segments (HIGH LEVEL) of the first case CASE1 and the fourth case CASE4.

Referring to the above illustration, the test information controller 110 may access the parts or segments of test result information TRI stored in the test result storage circuit 310 and determine the presence or absence of a problem related to reliability or stability of the storage device 500. The determination can be made not only at low levels but also at intermediate levels and high levels for each test case. In the above example, the test information controller 110 may determine that a problem exists in the reliability or stability of the storage device 500 at the high levels of the first case CASE1 and the fourth case CASE4.

FIG. 5 is a conceptual diagram illustrating the test control information storage circuit 320 shown in FIG. 3 according to an embodiment of the present disclosure.

Referring to FIG. 5, the test control information storage circuit 320 may classify or organize test control information TCI for each required or desired test case, as illustrated in FIG. 4 for example, into a plurality of test control information segments for each respective test level. The test control information storage circuit 320 may construct or organize the plurality of test control information segments in the form of a table. The test control information segments that comprise TCI may be stored in the test control information storage circuit 320.

For example, the test levels for each of test cases CASE1~CASE5, which are analogous to CASE1~CASE5 in FIG. 4, may be classified into a low-level test, an intermediate-level test, and a high-level test. The expression "LOW LEVEL" may refer to an test case in which the first, second and fourth cases CASE1, CASE2, and CASE4 are selected from among the test cases CASE1~CASE5. Test control information is stored in the selected parts or segments associated with first, second and fourth cases CASE1, CASE2, and CASE4 at the low level. The expression "INTERMEDIATE LEVEL" may refer to an test case in which the first and second cases CASE1 and CASE2 are selected from among the test cases CASE1~CASE5. Test control information is stored in the selected parts or segments associated with first and second cases CASE1 and CASE2 at the intermediate level. The expression "HIGH LEVEL" may refer to an test case in which the first, second, and fourth cases CASE1, CASE2, and CASE4 are selected from among the test cases CASE1~CASE5. Test control information is stored in the selected parts or segments associated with first, second and fourth cases CASE1, CASE2, and CASE4 at the high level.

In the above example, testing is necessary or desired for the selected cases at each level. After receiving test control information TCI from the test result storage circuit 310, the test information controller 110 may output test information TI for each of the selected first, second and fourth cases CASE1, CASE2, and CASE4 at the low level and at the high level to the parameter decision circuit 120. In addition, the test information controller 110 may output test information TI for each of the selected first and second cases CASE1 and CASE2 at the intermediate level to the parameter decision circuit 120.

FIG. 6 is a conceptual diagram illustrating the test condition storage circuit 330 shown in FIG. 3 according to an embodiment of the present disclosure.

The test condition storage circuit 330 according to the embodiment may classify test condition information TTI for each test case into a plurality of test condition information segments and test levels. The test condition storage circuit 330 may construct or organize the plurality of test condition information segments in the form of a table. The test condition information segments that comprise test condition information TTI may be stored in the test condition storage circuit 330.

In the example illustrated in FIG. 6, each of the test cases may be assigned a temperature information. For each case or temperature information, conditions for testing refresh characteristics in storage device 500 may be classified according to test levels. The conditions for testing refresh characteristics may be only one from among a plurality of reliability-related or stability-related conditions.

For example, test levels may be classified into a low-level test, an intermediate-level test, and a high-level test for the different temperature conditions $A°$ C. to $E°$ C. (i.e., $A°$ C., $B°$ C., $C°$ C., $D°$ C., and $E°$ C. in FIG. 6).

As can be seen from "LOW LEVEL" of FIG. 6, refresh characteristics corresponding to individual temperature conditions $A°$ C., $B°$ C., $C°$ C., $D°$ C., and $E°$ C. may be respectively set to 5\*\*ms, 2\*\*ms, 8\*ms, 4\*ms, and 2\*ms. As can be seen from "INTERMEDIATE LEVEL" of FIG. 6, refresh characteristics corresponding to individual temperature conditions $A°$ C., $B°$ C., $C°$ C., $D°$ C., and $E°$ C. may be respectively set to 4\*\*ms, 1\*\*ms, 7\*ms, 3\*ms, and 1\*ms. As can be seen from "HIGH LEVEL" of FIG. 6, refresh characteristics corresponding to individual temperature conditions $A°$ C., $B°$ C., $C°$ C., $D°$ C., and $E°$ C. may be respectively set to 4\*\*ms, 1\*\*ms, 6\*ms, 3\*ms, and 1\*ms.

In the above example, refresh characteristics corresponding to individual temperature conditions may be pre-established as specifications by accumulating test results having various conditions. In FIG. 6, each asterisk (*) may refer to zero "0" or a natural number higher than zero "0". Although this embodiment of the present disclosure has exemplarily disclosed that refresh characteristics range from a two-digit speed (e.g., 20 ms/refresh (milliseconds)) to a three-digit speed (e.g., 599 ms/refresh), for convenience of description and better understanding of the present disclosure, the scope of speed of such refresh characteristics is not limited thereto.

After receiving test condition information TTI from the test condition storage circuit 330, the test information controller 110 may allocate a relatively long period or time to a refresh cycle in each low-level test "LOW LEVEL" based on the received test condition information TTI, so that the corresponding related test information TI for testing refresh characteristics related to storage device 500 may be output to the parameter decision circuit 120. In another example, the test information controller 110 may allocate a relatively short time or period to a refresh cycle in each high-level test "HIGH LEVEL", so that the corresponding test information TI for testing refresh characteristics related to storage device 500 may be output to the parameter decision circuit 120.

Although embodiments of the present disclosure have exemplarily disclosed that test condition information TTI is differentially established in response to temperature-based refresh cycles, the scope or spirit of the present disclosure is not limited thereto. For instance, in another example, and the test condition information TTI may be established in response to a read consumption time (i.e., an address access time tAA) based on voltage sensed by sensing circuit 200. Other test conditions that may be established in response to other conditions or information are also contemplated by this disclosure.

Figure 7:
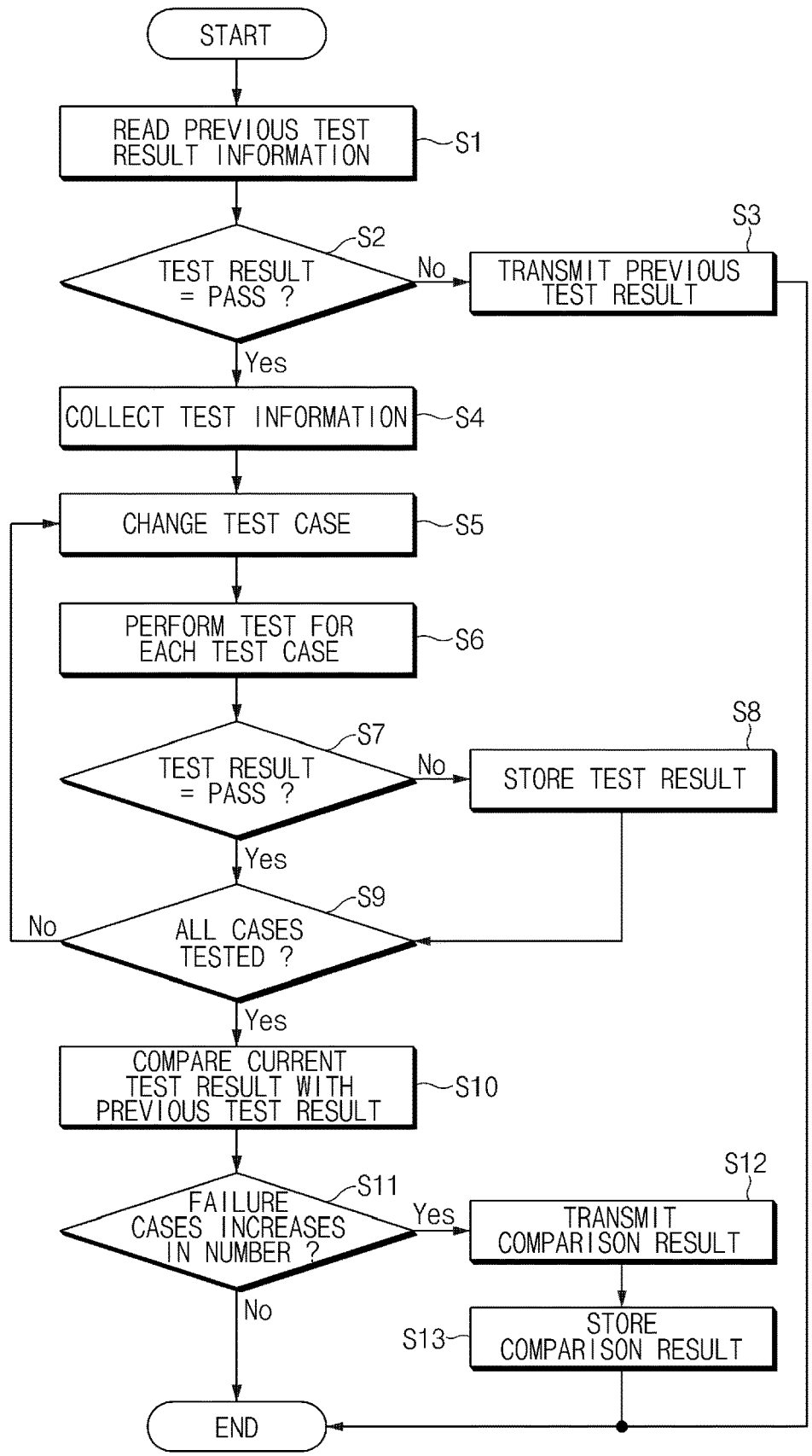
FIGS. 7 and 8 are flowcharts illustrating methods of operating a smart vehicle with the smart vehicle system shown in FIG. 1 according to embodiments of the present disclosure.

FIG. 7 is a flowchart illustrating methods of operating a smart vehicle with the smart vehicle system 10 shown in FIG. 1 according to an embodiment of the present disclosure. A method of operating a smart vehicle with the smart vehicle system 10 according to an embodiment of the present disclosure will hereinafter be described with reference to FIG. 7.

Referring to FIG. 7, the test information controller 110 may read previous test result information TRI stored in the test information storage circuit 300 (Step S1). The test information controller 110 may determine whether the previous test result information TRI, for each test case CASE1~CASE5, is in a pass state (PASS) or is in a fail state (FAIL). The test information controller 110 may determine whether to execute reliability-related or stability-related testing based on the determined information (Step S2).

When the previous test result information TRI is in a failure state (FAIL), the test information controller 110 does not perform reliability testing. The test information controller 110 may transmit output information TOUT indicating a failure state (FAIL) of the previous test result to an external device through the test information transmitter 140, and may then finish testing (Step S3). As illustrated below, various means for determining whether to execute reliability-related or stability-related testing may be used.

For example, the test information controller 110 may determine whether to execute the reliability-related or stability-related testing according to the presence or absence of a failure state (FAIL) at the intermediate level (INTERMEDIATE LEVEL) in the test result information TRI stored in the test result storage circuit 310 as shown in FIG. 4. In another example, the test information controller 110 may determine whether to execute the reliability-related or stability-related testing on the basis of the number of failure states (FAIL) at the intermediate level (INTERMEDIATE LEVEL) in the stored test result information TRI as shown in FIG. 4.

In a further example, when stored test result information TRI is in a pass state (PASS) for each test level, the test information controller 110 may read test control information TCI and test condition information TTI from the test information storage circuit 300. The test information controller 110 may transmit, to parameter decision circuit 120, test information TI regarding which reliability-related or stability-related testing will be carried out based on the read test condition information TTI in step S4.

Thereafter, the test information controller 110 may change the test cases CASE1~CASE5 in response to test control information TCI and the test condition information TTI in step S5. Although an exemplary embodiment of the present disclosure, for convenience of description and better understanding of the present disclosure, includes the test information controller 110 performing testing by sequentially changing the test cases from CASE1 through CASE5, the scope or spirit of the present disclosure is not limited thereto, and the order of executing the test cases CASE1~CASE5 may also be changed to different order as necessary.

The parameter decision circuit 120, in response to test information TI and sensing information SEN, may change the parameter value PARA used to perform testing for each test case CASE1~CASE5. The test controller 130 may selectively activate the test enable signal TEN in response to the parameter value PARA received from the parameter decision circuit 120.

The test circuit 400 may test the storage device 500 for each test case CASE1~CASE5 during activation of the test enable signal TEN in step S6. Subsequently, the test circuit 400 may output test result information TRI corresponding to each test operation to the test information controller 110.

Thereafter, the test information controller 110 may determine whether the test result information TRI is in a pass state (PASS) or in a failure state (FAIL) in step S7. When the test result information TRI is in the failure state (FAIL), the test information controller 110 may accumulate and store the test result information TRI in the test information storage circuit 300 in step S8, and may then proceed to the next step S9. In contrast, when the test result information TRI is in the pass state (PASS), the test information controller 110 may determine whether the test operation has been carried out in all test cases CASE1~CASE5 (Step S9).

After all the test cases CASE1~CASE5 have been completely tested in accordance with steps S5 through S9, the comparator 111 may compare previous test result information TRI stored in the test information storage circuit 300 with the test result information TRI received from the test circuit 400 in step S10. If the testing operation has not been carried out in all the test cases CASE1~CASE5, then the test information controller 110 returns to step S5, so that the test information controller 110 may change a current test case to another test case in step S5.

The test information controller 110 may determine whether the number of failure cases has increased based on the comparison result acquired from the comparator 111 in step S11. When the number of failure cases has increased in step S11, the test information controller 110 may transmit output information TOUT, indicating that the number of failure cases has increased, to the external device through the test information transmitter 140 in step S12. When the number of failure cases has increased in step S11, the test information controller 110 may store information about the increased failure cases in the test information storage circuit 300 in step S13. In contrast, when the number of failure cases has not increased in step S11, the test information controller 110 may finish testing.

Figure 8:
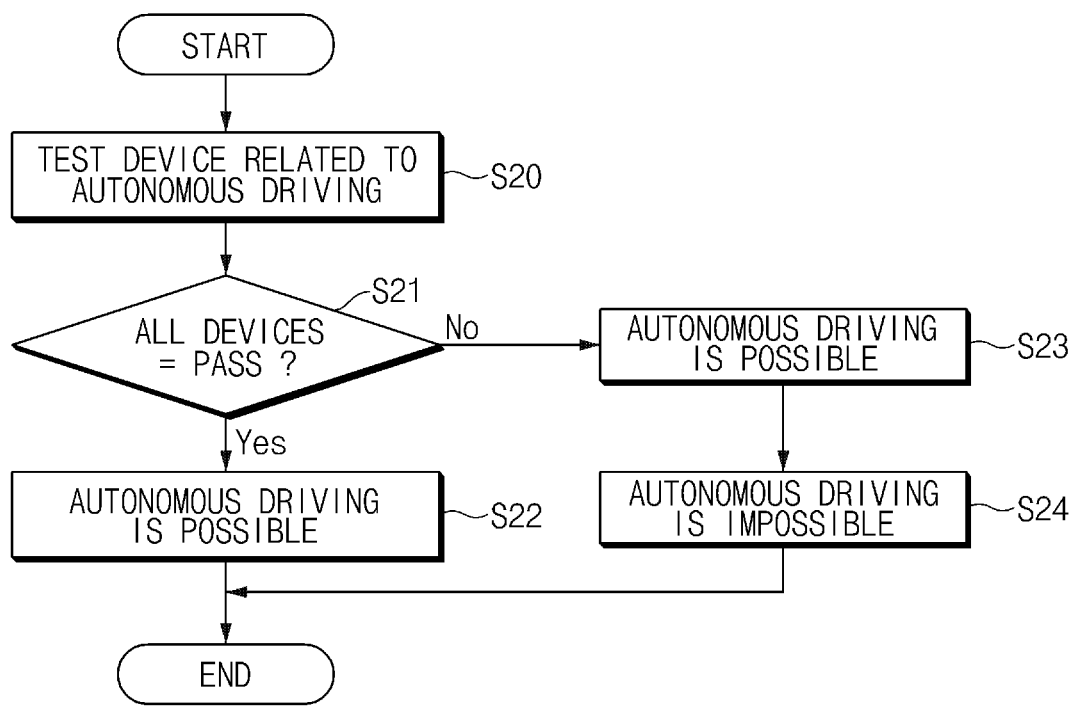

FIG. 8 is a flowchart illustrating a method of operating a smart vehicle with the smart vehicle system 10 shown in FIG. 1 according to an embodiment of the present disclosure. The following embodiment of FIG. 8 will hereinafter be described in detail by applying the storage circuit 300 to various operations related to autonomous driving and driving assistance, for convenience of description and better understanding of the present disclosure.

As various functions related to autonomous driving and driving assistance have recently been added to smart cars, demand for storage circuits 500 needed to store vehicle information and peripheral environment information is rapidly increasing. Especially, when an unexpected fault (or defect) occurs in functions such as autonomous driving and driving assistance, loss of life and property damage may occur.

The autonomous driving function or the driving assistance function for use in the smart vehicle uses information stored in the storage device 500. Therefore, high reliability is of importance to the storage device 500 with respect to the information therein used by the smart vehicle in these functions. However, as fabrication processes for implementing the storage device 500 are continuously focused miniaturization, it becomes more and more difficult to guarantee high reliability or stability with respect to operations of the storage device 500.

Therefore, the smart vehicle with smart vehicle system 10 according to an embodiment of the present disclosure may initially test characteristics of a device (e.g., the storage device 500) associated with autonomous driving using test control information TCI, test condition information TTI, etc. stored in the test information storage circuit 300 in step S20. The operation for testing reliability or stability of the storage device 500 according to embodiments may be carried out prior to the use or execution of autonomous driving functions, driving assistance functions, etc. in the smart vehicle.

If the result of reliability testing indicates that all devices are considered normal (i.e., a pass state PASS) in step S21, a driving mode of the smart vehicle is changed to the autonomous driving mode, such that the autonomous driving mode may be carried out in step S22.

The smart vehicle system 10 according to the embodiment may compare test result information TRI with previous test result information, and may transmit the result of testing to an external device. That is, the smart vehicle system 10 may transmit information associated with a faulty or defective device to the external device in step S23.

The smart vehicle system 10, according to embodiments herein, may allow a user (i.e., driver) to pre-recognize occurrence of a faulty or defective state prior to execution of the smart vehicle operation. The smart vehicle system 10 may determine whether to execute operations of the smart vehicle requiring a high degree of reliability. That is, the smart vehicle system 10 may test for the occurrence or non-occurrence of a fault, error or defect in devices in the smart vehicle (e.g., an autonomous driving device, a driving assistance device, etc.) that rely on a highly stable or highly reliable set of information in the devices' storage. If a fault occurs in the storage in those devices, the smart vehicle system 10 may change from a driving mode to an autonomous driving forbidden mode in step S24. The change may be recognized by a user of the smart vehicle as related to disabled autonomous driving.

As is apparent from the above description, the smart vehicle according to the embodiments of the present disclosure may perform a test related to reliability of operating a smart vehicle, and may record the result of the test, which can result in an increase in driving stability of the smart vehicle.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A smart vehicle system comprising:
    a test information storage circuit configured to classify a test control information preset to control an operation of a test circuit for each required test case, a test condition information in which information about a condition under which the test circuit is to be tested for each required test case is pre-set, and a test result information that reads a test result of the test circuit based on the test control information and the test condition information according to a plurality of test levels, and to store a classified result therein;
    a controller configured to determine at least one parameter value for performing a reliability test in response to a sensing information, the test control information, and the test condition information, and to generate a test enable signal in response to the parameter value; and
    the test circuit configured to test a characteristic of a storage circuit in response to the test enable signal.

2. The smart vehicle system according to claim 1, wherein the test information storage circuit includes at least one of an electrical fuse, a non-volatile memory, and a register.

3. The smart vehicle system according to claim 1, wherein the test information storage circuit comprises:
    a test result storage circuit configured to store the test result information;
    a test control information storage circuit configured to store the test control information; and
    a test condition storage circuit configured to store the test condition information.

4. The smart vehicle system according to claim 3, wherein the test result storage circuit is configured to classify a test level for each of a plurality of test cases into a low-level test, an intermediate-level test, and a high-level test, and to store the test result information.

5. The smart vehicle system according to claim 3, wherein the test control information storage circuit is configured to classify a level of the reliability test for each of a plurality of test cases into a low-level test, an intermediate-level test, and a high-level test, and to store the test control information.

6. The smart vehicle system according to claim 3, wherein the test condition storage circuit is configured to classify a level of the reliability test for each of a plurality of test cases into a low-level test, an intermediate-level test, and a high-level test, and to store the test condition information.

7. The smart vehicle system according to claim 1, wherein the controller is further configured to store the test result information received from the test circuit in the test information storage circuit.

8. The smart vehicle system according to claim 1, wherein the controller comprises:
    a test information controller configured to generate a test information by combining the test control information and the test condition information, and to store the test result information received from the test circuit in the test information storage circuit;
    a parameter decision circuit configured to determine the parameter value in response to the test information and the sensing information; and
    a test controller configured to generate the test enable signal according to the parameter value.

9. The smart vehicle system according to claim 8, wherein the test information controller is further configured to read a previous test result information stored in the test information storage circuit, and to perform the reliability test when a result of the test is normal indicating a pass state.

10. The smart vehicle system according to claim 8, wherein the test information controller is further configured to read a previous test result information stored in the test information storage circuit, and to transmit the previous test result information to an external device after passing the reliability test when a result of the test is a failure state.

11. The smart vehicle system according to claim 8, wherein the test information controller is further configured to determine whether to perform the reliability test according to the occurrence or non-occurrence of one or more failure states in a specific test level and according to a number of the one or more failure states in the specific test level.

12. The smart vehicle system according to claim 8, wherein the test information controller further comprises:
a comparator configured to compare the test result information stored in the test information storage circuit with the test result information received from the test circuit.

13. The smart vehicle system according to claim 12, wherein the test information controller is further configured to accumulate and store a result of a comparison from the comparator in the test information storage circuit, and to transmit the result of the comparison to an external device.

14. The smart vehicle system according to claim 8, wherein the test information controller is further configured to sequentially change a plurality of test cases in response to receiving the test control information and the test condition information.

15. The smart vehicle system according to claim 8, wherein the controller further comprises:
a test information transmitter configured to transmit output information corresponding to the test information to an external device.

16. The smart vehicle system according to claim 1, further comprising:
a sensor circuit configured to generate the sensing information after detecting information corresponding to an environment of a vehicle.

17. The smart vehicle system according to claim 1, wherein the sensing information includes any one of temperature and voltage.

18. The smart vehicle system according to claim 1, wherein the test circuit includes a Built-In Self-Test (BIST) circuit.

19. The smart vehicle system according to claim 1, wherein the storage circuit includes any one of a volatile memory and a non-volatile memory.

20. The smart vehicle system according to claim 1, wherein the storage circuit is included as a plurality of storage circuits, and the plurality of storage circuits is coupled to the test circuit through individual channels.

\* \* \* \* \*